(12) United States Patent
Kim et al.

(10) Patent No.: US 12,518,868 B2
(45) Date of Patent: Jan. 6, 2026

(54) ULTRASOUND IMAGING BY DEEP LEARNING AND ASSOCIATED DEVICES, SYSTEMS, AND METHODS

(71) Applicant: KONINKLIJKE PHILIPS N.V., Eindhoven (NL)

(72) Inventors: Seungsoo Kim, Andover, MA (US); Jun Seob Shin, Winchester, MA (US); Francois Guy Gerard Marie Vignon, Andover, MA (US); Jean-Luc Francois-Marie Robert, Cambridge, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 362 days.

(21) Appl. No.: 17/261,608

(22) PCT Filed: Jul. 19, 2019

(86) PCT No.: PCT/EP2019/069602
§ 371 (c)(1),
(2) Date: Jan. 20, 2021

(87) PCT Pub. No.: WO2020/016449
PCT Pub. Date: Jan. 23, 2020

(65) Prior Publication Data
US 2021/0265042 A1 Aug. 26, 2021

Related U.S. Application Data

(60) Provisional application No. 62/730,623, filed on Sep. 13, 2018, provisional application No. 62/700,960, filed on Jul. 20, 2018.

(51) Int. Cl.
*G16H 30/20* (2018.01)
*A61B 8/00* (2006.01)
*A61B 8/14* (2006.01)
*G06N 5/02* (2023.01)

(52) U.S. Cl.
CPC ............ *G16H 30/20* (2018.01); *A61B 8/145* (2013.01); *A61B 8/5246* (2013.01); *A61B 8/58* (2013.01); *G06N 5/02* (2013.01); *A61B 8/461* (2013.01)

(58) Field of Classification Search
CPC ...... G16H 30/20; A61B 8/145; A61B 8/5246; A61B 8/58; A61B 8/461; A61B 8/06;
(Continued)

(56) References Cited

U.S. PATENT DOCUMENTS

2017/0032702 A1 2/2017 Goksel et al.
2018/0153521 A1\* 6/2018 Martins ................ A61B 8/5269
(Continued)

FOREIGN PATENT DOCUMENTS

WO 2017223560 A1 12/2017
WO 2018127498 A1 7/2018

OTHER PUBLICATIONS

Varray, et al., "Hybrid Strategy to Simulate 3-D Nonlinear Radio-Frequency Ultrasound Using a Variant Spatial Psf", IEEE Transactions on Ultrasonics, Ferroelectrics, and Frequency Control, pp. 1-9.
(Continued)

*Primary Examiner* — Jonathan Cwern

(57) ABSTRACT

Ultrasound imaging devices, systems, and methods are provided. In one embodiment, an ultrasound imaging system comprising a processor configured to receive ultrasound channel data representative of a subject's anatomy generated from an ultrasound transducer; apply a predictive network to the ultrasound channel data to generate an image of the subject's anatomy; and output, to a display in communication with the processor, the image of the subject's anatomy. In one embodiment, a system for generating an image, the system comprising a memory storing at least one machine learning network; and a processor in communication with
(Continued)

the memory, the processor configured to receive raw channel data generated from an ultrasound transducer; apply the machine learning network to the raw channel data to replace one or more image processing steps, thereby generating modified data; and generate an image using the modified data.

26 Claims, 7 Drawing Sheets

(58) Field of Classification Search
CPC .......... A61B 8/12; A61B 8/485; A61B 8/488; A61B 8/5207; G06N 5/02; G01S 7/52042; G01S 7/52044; G01S 15/8979; G01S 7/52028; G01S 15/8915
See application file for complete search history.

(56) References Cited

U.S. PATENT DOCUMENTS

| | | | |
|---|---|---|---|
| 2018/0177461 A1* | 6/2018 | Bell | A61B 5/7267 |
| 2018/0330518 A1* | 11/2018 | Choi | A61B 8/0866 |
| 2019/0130562 A1* | 5/2019 | Liu | G06V 10/764 |
| 2019/0269384 A1* | 9/2019 | Lundberg | A61B 8/5207 |
| 2019/0336107 A1* | 11/2019 | Hope Simpson | G01S 15/8977 |

OTHER PUBLICATIONS

Reiter, et al., "A machine learning approach to identify point source locations in photoacoustic data", Photons Plus Ultrasound: Imaging and Sensing 2017 of SPIE, vol. 10064, pp. 100643J-1 to 100643J-6.
International Search and Written Opinion for International Application No. PCT/EP2019/069602, filed Jul. 19, 2019, 14 pages.
Jensen, et al., "Calculation of pressure fields from arbitrarily shaped, apodized, and excited ultrasound transducers," IEEE Transactions on Ultrasonics, Ferroelectrics, and Frequency Control, vol. 39, No. 2, Mar. 1992, pp. 262-267.
K. Hornik, et al., "Multilayer feedforward networks are universal approximators," Neural Networks, 1989, vol. 2, pp. 359-366.
Zhu, et al., "Image reconstruction by domain transform manifold learning", pp. 1-18 (Abstract).

* cited by examiner

ULTRASOUND IMAGING BY DEEP LEARNING AND ASSOCIATED DEVICES, SYSTEMS, AND METHODS

RELATED APPLICATIONS

This application is the U.S. National Phase application under 35 U.S.C. § 371 of International Application No. PCT/EP2019/069602, filed on Jul. 19, 2019, which claims the benefit and priority to both Provisional Application No. 62/730,623, filed Sep. 13, 2018, and Provisional Application No. 62/700,960, filed Jul. 20, 2018, which are incorporated by referenced in their entirety.

TECHNICAL FIELD

The present disclosure relates generally to ultrasound imaging and, in particular, to reconstructing ultrasound images from acquired ultrasound echo responses using a predictive model.

BACKGROUND

Ultrasound imaging systems are widely used for medical imaging. Conventional medical ultrasound systems require complex hardware and software to reconstruct an image from acquired raw data. For example, a conventional medical ultrasound system may include an ultrasound transducer probe coupled to a processing system and one or more display devices. The ultrasound transducer probe may include an array of ultrasound transducer elements that transmit acoustic waves into an object (e.g., a patient's body) and record acoustic waves reflected from the object. The transmission of the acoustic waves and/or the reception of reflected acoustic waves or echo responses can be performed by the same set of ultrasound transducer elements or different sets of ultrasound transducer elements. The processing system reconstructs or creates an image of the object and/or determines certain measurements from the echo responses by applying beamforming, signal processing, and/or image processing techniques. The beamforming, signal processing, and/or image processing are complex and may require various electronics, dedicated hardware, and complex software for the processing. Thus, the system complexity of a conventional medical ultrasound system can be high and the development time for a new system architecture or application can be long and costly, limiting the applications of ultrasound imaging.

SUMMARY

While existing ultrasound imaging has proved useful for clinical guidance and diagnosis, there remains a need for improved systems and techniques for reducing the system cost and system size for current ultrasound imaging application and reducing development time and effort for new ultrasound imaging applications. Embodiments of the present disclosure provide a deep learning framework to reconstruct ultrasound images from acquired ultrasound echo data. For example, an imaging probe including a transducer array may be used for ultrasound imaging. The transducer array may include an array of acoustic elements that emit ultrasound pulses into an object (e.g., a patient's anatomy) and receive ultrasound echo responses (e.g., ultrasonic waves reflected from the object). A predictive network (e.g., a convolutional neural network (CNN)) can be trained to reconstruct an ultrasound image from the acquired ultrasound echo responses. For example, the predictive network can be trained to approximate and optimize conventional beamforming and ultrasound signal and/or image processing functions. The ultrasound echo responses can be provided to the predictive network in various formats, for example, in the form of per channel raw radio frequency (RF) data or per channel baseband in-phase quadrature-phase (IQ) data. Alternatively, the predictive network can be trained to reconstruct an ultrasound image from beamformed data instead of the raw acquired ultrasound echo data. In an embodiment, the predictive network can be trained to produce high-resolution, speckle free ultrasound images that have a high quality than conventionally constructed ultrasound images.

In one embodiment, an ultrasound imaging system comprising a processor configured to receive ultrasound channel data representative of a subject's anatomy generated from an ultrasound transducer; and apply a predictive network to the ultrasound channel data to generate an image of the subject's anatomy; and output, to a display in communication with the processor, the image of the subject's anatomy.

In some embodiments, wherein the ultrasound transducer comprises an array of acoustic elements, wherein the ultrasound channel data includes a plurality of ultrasound echo channel data streams, and wherein each of the plurality of ultrasound echo channel data streams is generated from one acoustic element of the array of acoustic elements. In some embodiments, wherein the plurality of ultrasound echo channel data streams include radio frequency (RF) data representing the subject's anatomy. In some embodiments, wherein the processor is further configured to convert the RF data to in-phase quadrature-phase (IQ) data before applying the predictive network. In some embodiments, wherein the processor is further configured to perform beamforming on the ultrasound echo channel data streams before applying the predictive network. In some embodiments, wherein the image includes at least one of morphological information of the subject's anatomy, functional information of the subject's anatomy, or a quantitative measurement of the subject's anatomy. In some embodiments, wherein the image includes at least one of B-mode information of the subject's anatomy, stress information of the subject's anatomy, elasticity information of the subject's anatomy, tissue Doppler information of the subject's anatomy, or blood flow Doppler information of the subject's anatomy. In some embodiments, wherein the predictive network is trained by providing test ultrasound channel data and a corresponding test image representative of a test subject; and training the predictive network to produce the test image from the test ultrasound channel data. In some embodiments, wherein the test image is generated from the test ultrasound channel data by performing at least one of beamforming, B-mode processing, Doppler processing, or scan conversion processing to the test ultrasound channel data. In some embodiments, wherein the test ultrasound channel data is generated from the test image based on an ultrasound transducer configuration parameter. In some embodiments, wherein the test ultrasound channel data includes at least one of radio frequency (RF) data, in-phase quadrature-phase (IQ) data, or beamformed data. In some embodiments, the system includes an ultrasound imaging probe including the ultrasound transducer, and wherein the processor is in communication with the ultrasound transducer and configured to receive the ultrasound channel data from the ultrasound transducer. In some embodiments, wherein the ultrasound imaging probe includes the processor.

In one embodiment, a method of ultrasound imaging, comprising receiving ultrasound channel data representative of a subject's anatomy generated from an ultrasound transducer; applying a predictive network to the ultrasound channel data to generate an image of the subject's anatomy; and displaying, by a display, the image of the subject's anatomy.

In some embodiments, wherein the ultrasound transducer comprises an array of acoustic elements, wherein the ultrasound channel data includes a plurality of ultrasound echo channel data streams, and wherein each of the plurality of ultrasound echo channel data streams is generated from one acoustic element of the array of acoustic elements. In some embodiments, wherein the plurality of ultrasound echo channel data streams include radio frequency (RF) data representing the subject's anatomy. In some embodiments, the method further comprises converting the RF data to in-phase quadrature-phase (IQ) data before applying the predictive network. In some embodiments, the method further comprises performing beamforming on the ultrasound echo channel data streams before applying the predictive network. In some embodiments, wherein the image includes at least one of morphological information of the subject's anatomy, functional information of the subject's anatomy, or a quantitative measurement of the subject's anatomy. In some embodiments, wherein the image includes at least one of B-mode information of the subject's anatomy, stress information of the subject's anatomy, elasticity information of the subject's anatomy, tissue Doppler information of the subject's anatomy, or blood flow Doppler information of the subject's anatomy.

In one embodiment, a system for generating an image, the system comprising a memory storing at least one machine learning network; and a processor in communication with the memory, the processor configured to receive raw channel data generated from an ultrasound transducer; apply the machine learning network to the raw channel data to replace one or more image processing steps, thereby generating modified data, wherein the machine learning network is trained using a plurality of ultrasound images of one or more target images; and generate an image using the modified data, wherein the generated image comprises a trait of the target images.

In some embodiments, wherein the plurality of ultrasound images are simulated. In some embodiments, wherein the image processing steps comprise beamforming, filtering, dynamic range applications, and compression. In some embodiments, wherein the target images comprise photograph images. In some embodiments, wherein the trait comprises a resolution of about 1 wavelength or below. In some embodiments, wherein the trait comprises an amount of speckle.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
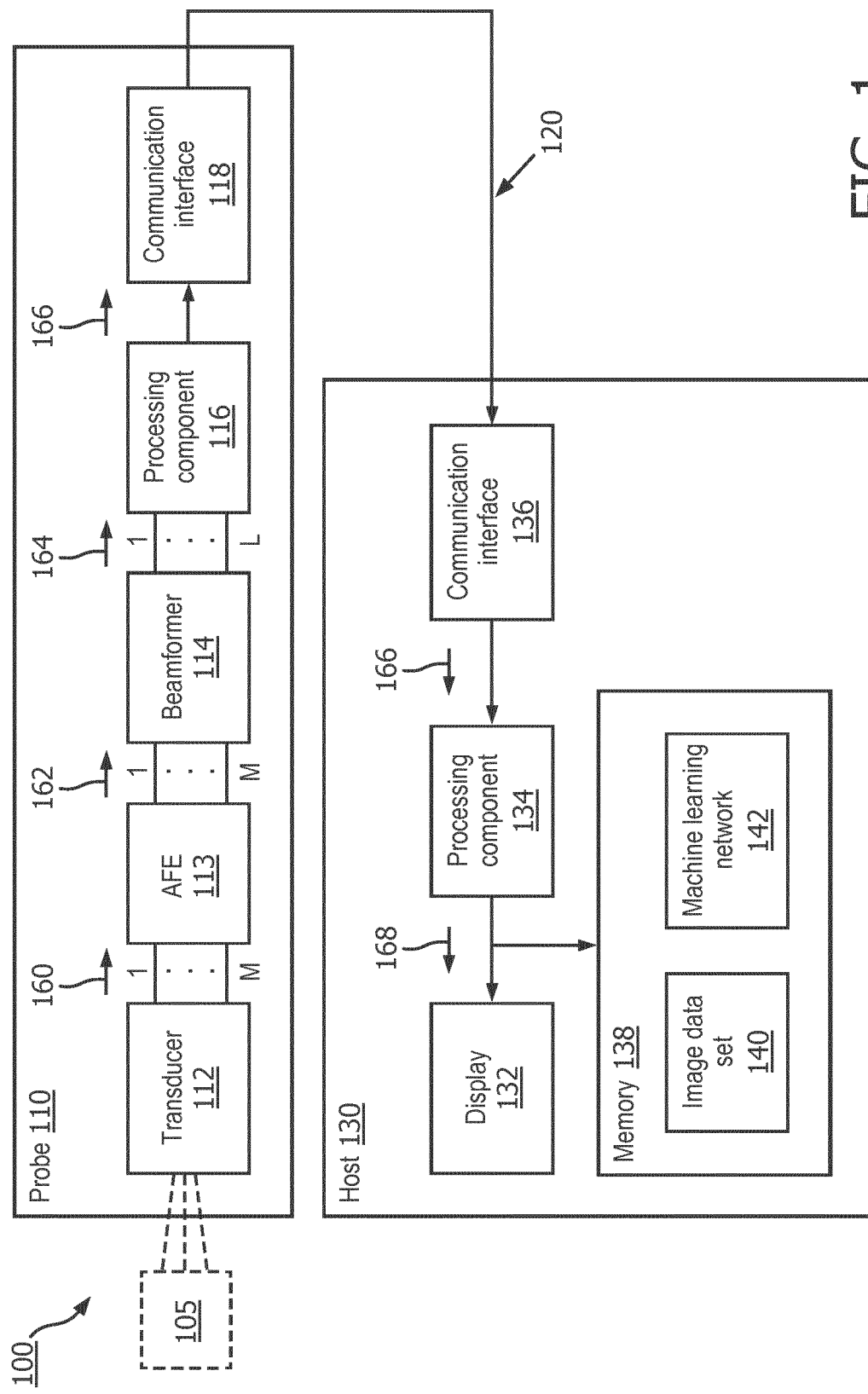
FIG. 1 is a schematic diagram of an ultrasound imaging system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic diagram of an ultrasound imaging system 100, according to aspects of the present disclosure. The system 100 is used for scanning an area or volume of a patient's body. The system 100 includes an ultrasound imaging probe 110 in communication with a host 130 over a communication interface or link 120. The probe 110 includes a transducer 112, an analog front end (AFE) 113, a beamformer 114, a processing component 116, and a communication interface 118. The host 130 includes a display 132, a processing component 134, a communication interface 136, and a memory 138.

The probe 110 may be in any suitable form for imaging various body parts of a patient while positioned inside or outside of the patient's body. In an embodiment, the probe 110 is an external ultrasound imaging device including a housing configured for handheld operation by a user. The transducer 112 can be configured to obtain ultrasound data while the user grasps the housing of the probe 110 such that the transducer 112 is positioned adjacent to and/or in contact with a patient's skin. The probe 110 is configured to obtain ultrasound data of anatomy within the patient's body while the probe 110 is positioned outside of the patient's body. In some other embodiments, the probe 110 may be in the form of a catheter, an intravascular ultrasound (IVUS) catheter, an intracardiac echocardiography (ICE) catheter, a transesophageal echocardiography (TEE) probe, a transthoracic echocardiography (TTE) probe, an endo-cavity probe, a handheld ultrasound scanner, or a patch-based ultrasound device.

The transducer 112 emits ultrasound signals towards an anatomical object 105 and receives echo signals reflected from the object 105 back to the transducer 112. The object 105 may include any anatomy (e.g., lung, blood vessel, tissues, heart, kidney, and/or liver) of a patient that is suitable for ultrasound imaging examination. The ultrasound transducer 112 can include any suitable number of acoustic elements, including one or more acoustic elements and/or plurality of acoustic elements. In some instances, the transducer 112 includes a single acoustic element. In some instances, the transducer 112 may include an array of acoustic elements with any number of acoustic elements in any suitable configuration. For example, the transducer 112 can include between 1 acoustic element and 1000 acoustic elements, including values such as 2 acoustic elements, 4 acoustic elements, 36 acoustic elements, 64 acoustic elements, 128 acoustic elements, 500 acoustic elements, 812 acoustic elements, and/or other values both larger and smaller. In some instances, the transducer 112 may include an array of acoustic elements with any number of acoustic elements in any suitable configuration, such as a linear array, a planar array, a curved array, a curvilinear array, a circumferential array, an annular array, a phased array, a matrix array, a one-dimensional (1D) array, a 1.x dimensional array (e.g., a 1.5D array), or a two-dimensional (2D) array. The array of acoustic elements (e.g., one or more rows, one or more columns, and/or one or more orientations) that can be uniformly or independently controlled and activated. The transducer 112 can be configured to obtain one-dimensional, two-dimensional, and/or three-dimensional images of patient anatomy. The acoustic elements may also be referred to as transducer elements or imaging elements. In some embodiments, the transducer 112 may include a piezoelectric micromachined ultrasound transducer (PMUT), capacitive micromachined ultrasonic transducer (CMUT), single crystal, lead zirconate titanate (PZT), PZT composite, other suitable transducer types, and/or combinations thereof.

The AFE 113 is coupled to the transducer 112. The AFE 113 may include components that control the transmissions of ultrasound waves at the transducer 112 and/or the receptions of echo responses at the transducer 112. For example, in a transmit path, the AFE 113 may include a digital-to-analog converter (DAC), filters, gain controls, and/or a high-voltage (HV) transmitter that drives or triggers ultrasound pulse emissions at the acoustic elements or transducer elements of the transducer 112. In a receive path, the AFE 113 may include gain controls, filters, and analog-to-digital converts (ADCs) that receive echo responses from the transducer elements of the transducer 112. The AFE 113 may further include a plurality of transmit/receive (T/R) switches that control the switching between transmit and receive at the transducer elements and prevent the high-voltage pulses from damaging the transducer elements for the transducer 112.

In an embodiment, the transducer 112 includes M plurality of transducer elements. In some embodiments, M can be about 2, 16, 64, 128, 192, or greater than 192. In the receive path, each transducer element can convert ultrasound energy received from a reflected ultrasound pulse to an electrical signal, forming a single receive channel. In other words, the transducer 112 can generate M analog ultrasound echo channel signals 160. The AFE 113 can be coupled to the transducer 112 via M signal lines. The ADCs in the AFE 113 can produce M digital ultrasound echo channel signals 162, each corresponding to an analog ultrasound echo channel signal 160 received at one of the transducer element in the transducer 112. The digital ultrasound echo channel signals 162 can also be referred to as ultrasound echo data streams.

The beamformer 114 is coupled to the AFE 113. The beamformer 114 may include delay elements and summing elements configured to control transmit and/or receive beamforming at the transducer 112. The beamformer 114 may apply appropriate time-delays to at least a subset of the digital ultrasound echo channel signals 162 and combine the time-delayed digital ultrasound echo channel signals to form a beamformed signal 164 (e.g., a focused beam). For example, the beamformer 114 may produce L plurality of beamformed signals 164, where L is a positive integer smaller than M. In some embodiments, the beamformer 114 may include multiple stages of beamforming. For example, the beamformer 114 may perform partial beamforming to combine a subset of the digital ultrasound echo channel signals 162 to form partially beamformed signals and subsequently beamform the partial beamformed signals to produce fully beamformed signals. While the beamformer 114 is described in the context of digital beamforming, in some embodiments, the AFE 113 can include electronics and/or dedicated hardware for analog partial beamforming.

The processing component 116 is coupled to the beamformer 114. The processing component 116 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processing component 134 may also be implemented as a combination of computing devices, e.g., a combination of a DSP and a microprocessor, a plurality of microprocessors, one or more microprocessors in conjunction with a DSP core, or any other such configuration. The processing component 116 is configured to process the beamformed signals 164. For example, the processing component 116 may perform a series of coherent and/or in-coherent signal processing, such as compounding, envelope detection, logarithmic compression, and/or non-linear image filtering, to the beamformed signals 164 to produce image signals 166.

The communication interface 118 is coupled to the processing component 116. The communication interface 118 may include one or more transmitters, one or more receivers, one or more transceivers, and/or circuitry for transmitting and/or receiving communication signals. The communication interface 118 can include hardware components and/or software components implementing a particular communication protocol suitable for transporting signals over the communication link 120 to the host 130. The communication interface 118 can be referred to as a communication device or a communication interface module.

The communication link 120 may be any suitable communication link. For example, the communication link 120 may be a wired link, such as a universal serial bus (USB) link or an Ethernet link. Alternatively, the communication link 120 may be a wireless link, such as an ultra-wideband (UWB) link, an Institute of Electrical and Electronics Engineers (IEEE) 802.11 WiFi link, or a Bluetooth link.

At the host 130, the communication interface 136 may receive the image signals 166. The communication interface 136 may be substantially similar to the communication interface 118. The host 130 may be any suitable computing and display device, such as a workstation, a personal computer (PC), a laptop, a tablet, or a mobile phone.

The processing component 134 is coupled to the communication interface 136. The processing component 134 may be implemented as a combination of software components and hardware components. The processing component 134 may include a central processing unit (CPU), a graphics processing unit (GPU), a digital signal processor (DSP), an application-specific integrated circuit (ASIC), a controller, a FPGA device, another hardware device, a firmware device, or any combination thereof configured to perform the operations described herein. The processing component 134 may also be implemented as a combination of computing devices, e.g., a combination of a DSP and a microprocessor, a plurality of microprocessors, one or more microprocessors in conjunction with a DSP core, or any other such configuration.

The processing component 134 can be configured to generate or reconstruct images 168 of the object 105 from the image signals 166 received from the probe 110. The processing component 134 can further apply image processing techniques to the image signals 166. In some embodiments, the processing component 134 can perform scan conversions to form 2D or three-dimensional (3D) volume images from the image data. In some embodiments, the processing component 134 can perform real-time processing on the image signals 166 to provide a streaming video of ultrasound images 168 of the object 105. The images 168 can include morphological information, functional information, and/or quantitative measurement of the object 105 depending on the acquisition modalities used at the probe 110. The morphological information may include anatomical structural information (e.g., B-mode information) of the object 105. Examples of functional information may include tissue strain, elasticity, Doppler flow, tissue Doppler flow, and/or blood flow information associated with the object 105. Examples of quantitative measurements may include a blood flow velocity, blood flow volume, lumen diameter, lumen area, stenosis length, plaque burden, and/or tissue elasticity. In some embodiments, the processing component 134 can perform image analysis on the image signals 166 to determine clinical conditions associated with the object 105.

The display 132 is coupled to the processing component 134. The display 132 may be a monitor or any suitable display. The display 132 is configured to display ultrasound images, image videos, and/or information associated with the object 105 under examination.

While the system 100 is illustrated with beamforming and signal processing functions performed by the beamformer 114 and the processing component 116, respectively, at the probe 110, in some embodiments, at least some of the beamforming and/or signal processing functions may be performed at the host 130. In other words, the probe 110 may transfer digital ultrasound echo channel signals 162 or beamformed signals 164 to the host 130 for processing. In some other embodiments, the probe 110 may transfer the analog ultrasound echo channel signals 160, for example, with some gain controls and/or filtering, to the host 130 for processing. In addition, the communication interface 118 at the probe 110 may be an industry standard physical connector and/or a proprietary physical connector and the communication link 120 may include any industry standard cables, coaxial cables, and/or proprietary cables. In general, the system 100 may represent any types of ultrasound imaging system, where ultrasound imaging functionalities may be partitioned in any suitable manner across a probe (e.g., including a transducer 112), a host, and/or any intermediate processing subsystem between the probe and the host.

The system 100 can be configured for use in various stages of ultrasound imaging. In an embodiment, the system 100 may be used for collecting ultrasound images to form a training dataset for training a deep learning network for ultrasound imaging, as described in greater detail herein. For example, the host 130 may include a memory 138, which may be any suitable storage device, such as a cache memory (e.g., a cache memory of the processing component 134), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, solid state drives, other forms of volatile and non-volatile memory, or a combination of different types of memory. The memory 138 can be configured to store an image dataset 140 and a machine learning network 142. For example, the image dataset 140 can store the digital ultrasound echo channel signals 162 in association with the corresponding image 168. The image data set 140 can be used to train the machine learning network 142, which may be a deep leaning network, for ultrasound imaging as described in greater detail herein.

As can be seen in the system 100, the generation or reconstruction of ultrasound images from raw acquired data (e.g., the analog ultrasound echo channel signals 160 and/or the digital ultrasound echo channel signals 162) require beamforming and a series of signal processing and/or image processing blocks (e.g., the beamformer 114, the processing component 116 at the probe 110 and/or the processing component 134 at the host 130). The hardware and/or software required for the image reconstruction from the raw data can be complex and costly. In addition, the development time for deploying a new ultrasound imaging application can be long due to the system complexity.

The present disclosure provides techniques to reconstruct or generate ultrasound images from raw channel data using a machine learning network instead of the conventional ultrasound image reconstruction techniques (e.g., the beamforming, the signal processing, and/or the image processing).

Figure 2:
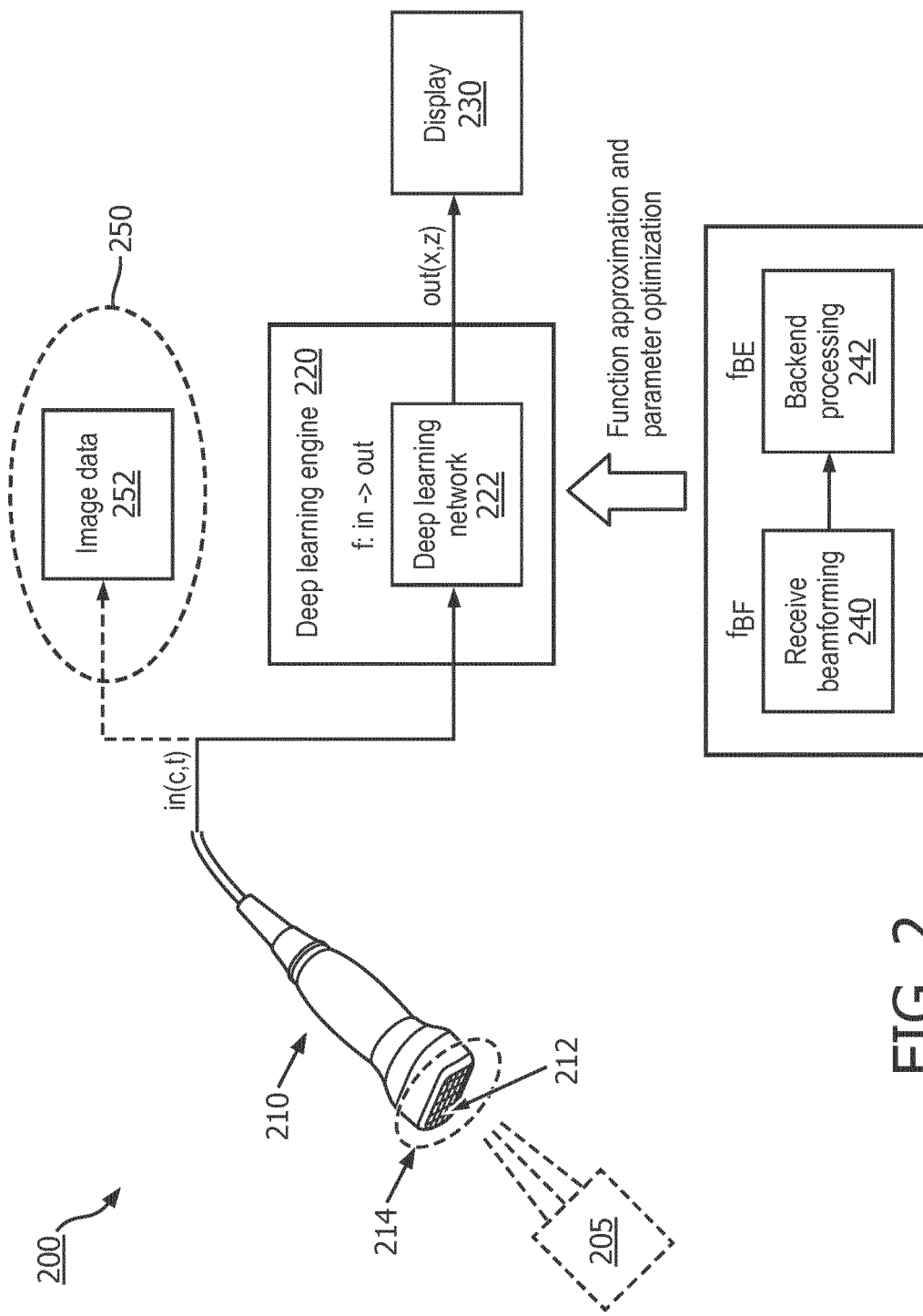
FIG. 2 is a schematic diagram of a deep-learning based ultrasound imaging system, according to aspects of the present disclosure.

FIG. 2 is a schematic diagram of a deep-learning based ultrasound imaging system 200, according to aspects of the present disclosure. The system 200 includes an ultrasound imaging probe 210, a deep learning engine 220, and a display 230. The probe 210 and the display 230 are substantially similar to the probe 110 and the display 132, respectively. For example, the probe 210 includes at least an array 214 of transducer elements 212 similar to the transducer 112. The transducer elements 212 can emit ultrasound signals towards an object 205 (e.g., the object 105) and receive ultrasound echo responses reflected from the object 205. Depending on the embodiments, the probe 210 may or may not include a beamformer (e.g., the beamformer 114) and/or a processing component (e.g., the processing component 116). At a high level, the deep learning engine 220 receives the ultrasound echo responses and outputs an ultrasound image (e.g., the image 168) of the object 205 for display on the display 230.

The deep learning engine 220 may include hardware and/or software components configured to apply a deep learning network 222 (e.g., the machine learning network 142) to the ultrasound echo responses to produce the ultrasound image replacing conventional ultrasound image reconstruction operations. The conventional ultrasound image reconstruction operations may include receive beamforming operations 240 and backend processing operations

242. The deep learning network 222 replaces conventional ultrasound image reconstruction operations through function approximations and parameter optimizations.

As an example, the ultrasound echo responses acquired from the probe 210 may be represented by in(c, t), where c represents channel index and t represents time. The acquired data in(c, t) may be similar to the digital ultrasound echo channel signals 162 in the system 100. The acquire data in(c, t) may be referred to as RF data, where each channel corresponds to one transducer element 212.

The receive beamforming operations 240 may be substantially similar to the operations applied by the beamformer 114 of the system 100 described above with respect to FIG. 1. For example, the beamforming operations 240 generate or reconstruct beamformed RF data from the raw RF data in(c, t). The beamforming operations 240 can be expressed as shown below:

$$bf(x,z) = f_{BF}(\text{in}(c,t), parA), \quad (1)$$

where bf represents the beamformed RF data, x and z are spatial coordinates, $f_{BF}$ is a beamforming transfer function, and parA includes one or more beamforming optimization parameters associated with the speed of sound, apodization function, line density, and/or any parameter related to beamforming.

The backend processing operations 242 may be substantially similar to the operations applied by the processing component 116 and/or the processing component 134 of the system 100 described above with respect to FIG. 1. For example, the backend processing operations 242 generate or reconstruct an output image from the beamformed RF data bf(x, z). The backend processing operations 242 can be expressed as shown below:

$$\text{out}(x,z) = f_{BE}(bf(x,z), parB), \quad (2)$$

where out represents the output image, $f_{BE}$ is an ultrasound imaging backend processing transfer function representing coherent and/or incoherent signal processing functions including compounding, envelope detection, logarithmic compression, non-linear image filtering, B-mode processing, Doppler processing, scan conversions, and/or image post processing, and parB includes one or more backend processing optimization parameters associated with a non-linear compression curve, a dynamic range, gain filter coefficients, and/or any parameter related to ultrasound image reconstruction.

The overall ultrasound imaging reconstruction transfer function, denoted as $f$, from the received raw channel data in(c, t) to the final optimized ultrasound image out(x, z) can be expressed as shown below:

$$\text{out}(x, z) = f(\text{in}(c, t), parA, parB) \quad (3)$$
$$= f_{BE}(f_{BF}(\text{in}(c, t), parA), parB).$$

The deep learning network 222 is trained to approximate the function $f$ with optimized parameters parA and parB. The architecture of the deep learning network 222 and the training of the deep learning network 222 are described in greater detail herein.

In an embodiment, the raw channel data in(c, t)) acquired from the probe 210 can be transmitted to and stored in a cloud storage network 250 shown as image data 252. The deep learning engine 220 may be located at a remote processing system similar to the host 130. The remote processing system can be positioned remote from the patient and the probe 210, such as in a different room or building from where the raw channel data is acquired. For example, the raw channel data can be acquired by the probe 210 in a point of care setting, such as a room in a hospital or other clinical facility. The remote processing system can be located in a different room of the facility or in a different facility. The remote processing system may access the image data 252 in the cloud storage network 250 and the deep learning engine 220 may be applied to the image data 252 to produce output ultrasound images out(x,z). The output ultrasound images can be transmitted to a different location where the patient and/or clinician is located to review the output ultrasound images. For example, the output ultrasound images can be transmitted to a point of care location, such as the room where the raw channel data was acquired or a different room where the patient/clinician will review the ultrasound images. In this manner, the deep learning engine 220 is applied to the image data 252 and the output ultrasound images are generated in a location remote from the where the raw channel data is acquired and/or where the patient/clinician reviews the output ultrasound images.

While FIG. 2 illustrates the deep learning engine 220 as an external component to the probe 210, in some embodiments, the deep learning engine 220 can be integrated as an internal component (e.g., implemented as an ASIC or an FPGA device) to the probe 210.

Generally, aspects of the present disclosure describe using a machine learning network to replace one or more conventional ultrasound image processing steps that are required to generate conventional ultrasound images. The machine learning network is applied to the raw channel data obtained by the ultrasound transducer, rather than one or more of the conventional image processing steps being carried out on the raw channel data (e.g., beamforming, filtering, dynamic range applications, and/or compression). The machine learning network is trained using a plurality of ultrasound images of one or more target images. Application of the machine learning network to the raw channel data results in modified data. A processor generates the ultrasound image using the modified data, which includes a trait of the target images (e.g., anatomical structure, speckle, etc.).

Figure 3:
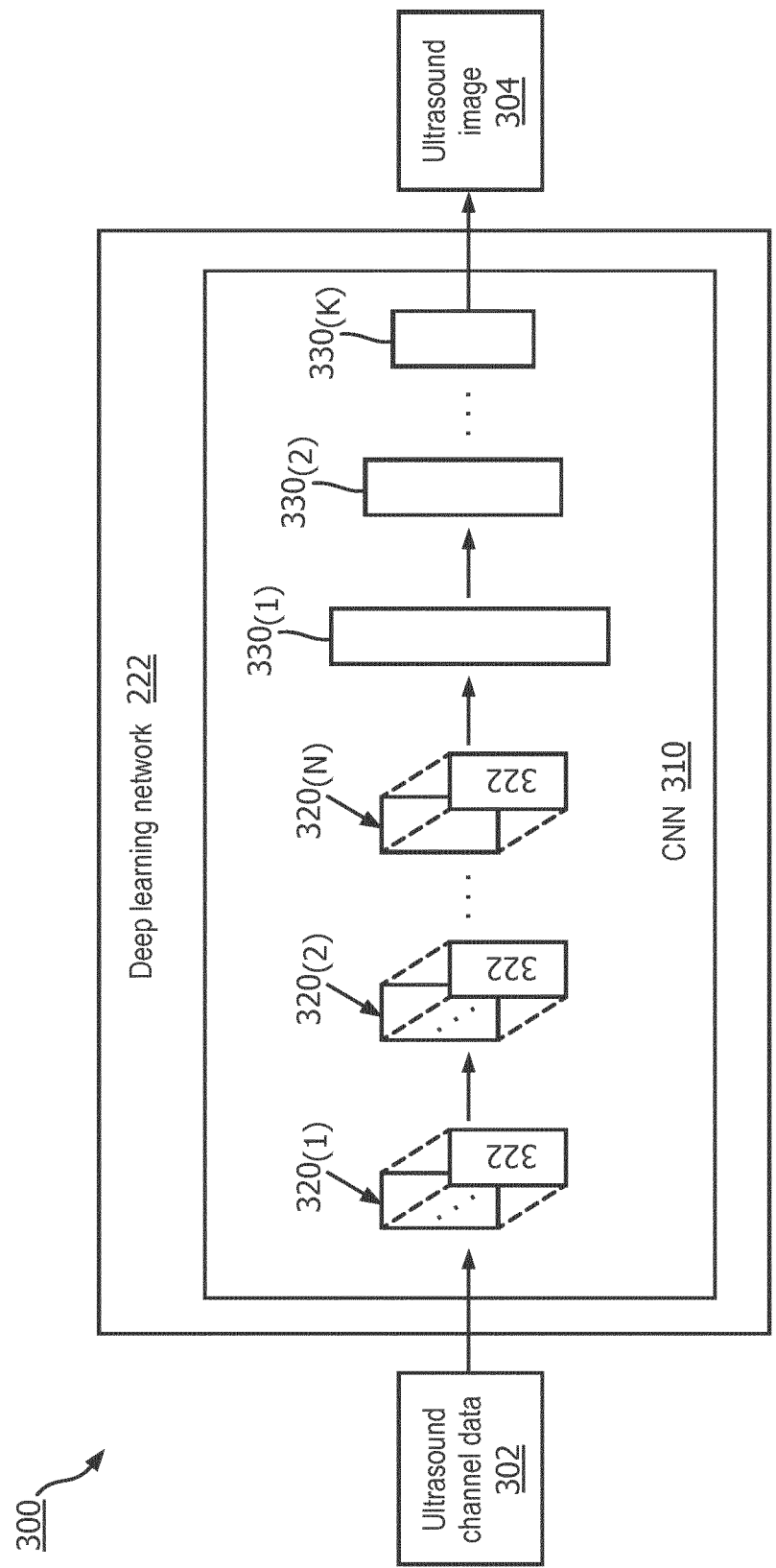
FIG. 3 is a schematic diagram illustrating a configuration of a deep learning network, according to aspects of the present disclosure.

FIG. 3 is a schematic diagram illustrating a configuration 300 of the deep learning network 222, according to aspects of the present disclosure. The deep learning network 222 may include one or more convolutional neural networks (CNNs) 310. The CNN 310 may operate on ultrasound channel data 302. For example, the ultrasound channel data 302 may correspond to the digital ultrasound echo channel signals 162 of the system 100 or the raw RF channel data in(c, t) of the system 200.

The CNN 310 may include a set of N convolutional layers 320 followed by a set of K fully connected layers 330, where N and K may be any positive integers. The values N and K may vary depending on the embodiments. In some instances, N may be about 12 and K may be about 2. Each convolutional layer 320 may include a set of filters 322 configured to extract features from the ultrasound channel data 302. While not shown in FIG. 3, in some embodiments, the convolutional layers 320 may be interleaved with spatial pooling layers, each including a set of downsampling operations that may reduce the dimensionality of the extracted imaging features. In addition, each convolutional layer 320 may a include non-linearity function (e.g., including rectified non-linear (ReLU) operations) configured to extract rectified feature maps. Further, each convolutional layer 320 may include a batch normalization function to speed up the training of the CNN 310. The fully connected layers 330 may be non-linear and may gradually shrink the high-dimensional output of the last convolutional layer $320_{(N)}$ to produce an output ultrasound image 304. For example, the ultrasound image 304 may correspond to output image out(x,z) of the system 200 or the image 168 of the system 100.

As can be observed, the implementation or application of the CNN 310 requires mostly filtering and/or weighting operations, which are multiply-add operations. As such, the implementation or application of the CNN 310 may require significantly less computations and/or less complex hardware compared to the conventional receive beamforming operations 240 and the backend processing operations 242. As such, the size or footprint of a deep learning engine (e.g., the deep learning engine 220) can be relatively small compared to the conventional beamformer (e.g., the beamformer 114) and backend processing component (e.g., the processing components 116 and 134). Accordingly, the present disclosure can enable the integration of a deep learning engine within a transducer probe (e.g., the probe 210).

One challenge in providing a well-developed deep learning framework for ultrasound imaging applications is to have a large dataset including a large number of input-output pairs (e.g., pairs of in(c, t) and out(x, z)) for the training. As described above, the system 100 can be used to provide the input-output pairs (e.g., the digital ultrasound echo channel signals 162 and the corresponding image 168) for the training. However, the collection of a dataset large enough to provide a well-trained deep learning network can be time-consuming and complex.

The present disclosure further provides techniques that can train a deep learning network for ultrasound imaging applications based on simulations instead of collecting data from a clinical setting. Accordingly, the present disclosure can simplify the process of generating or collecting training data and can reduce the time and effort required to collect the training data, and thus allowing new ultrasound applications to be deployed quickly and easily. In addition, the simulation-based training can train a deep learning network to output high-resolution (e.g., speckle free) ultrasound images with a higher quality than conventionally reconstructed ultrasound images.

Figure 4:
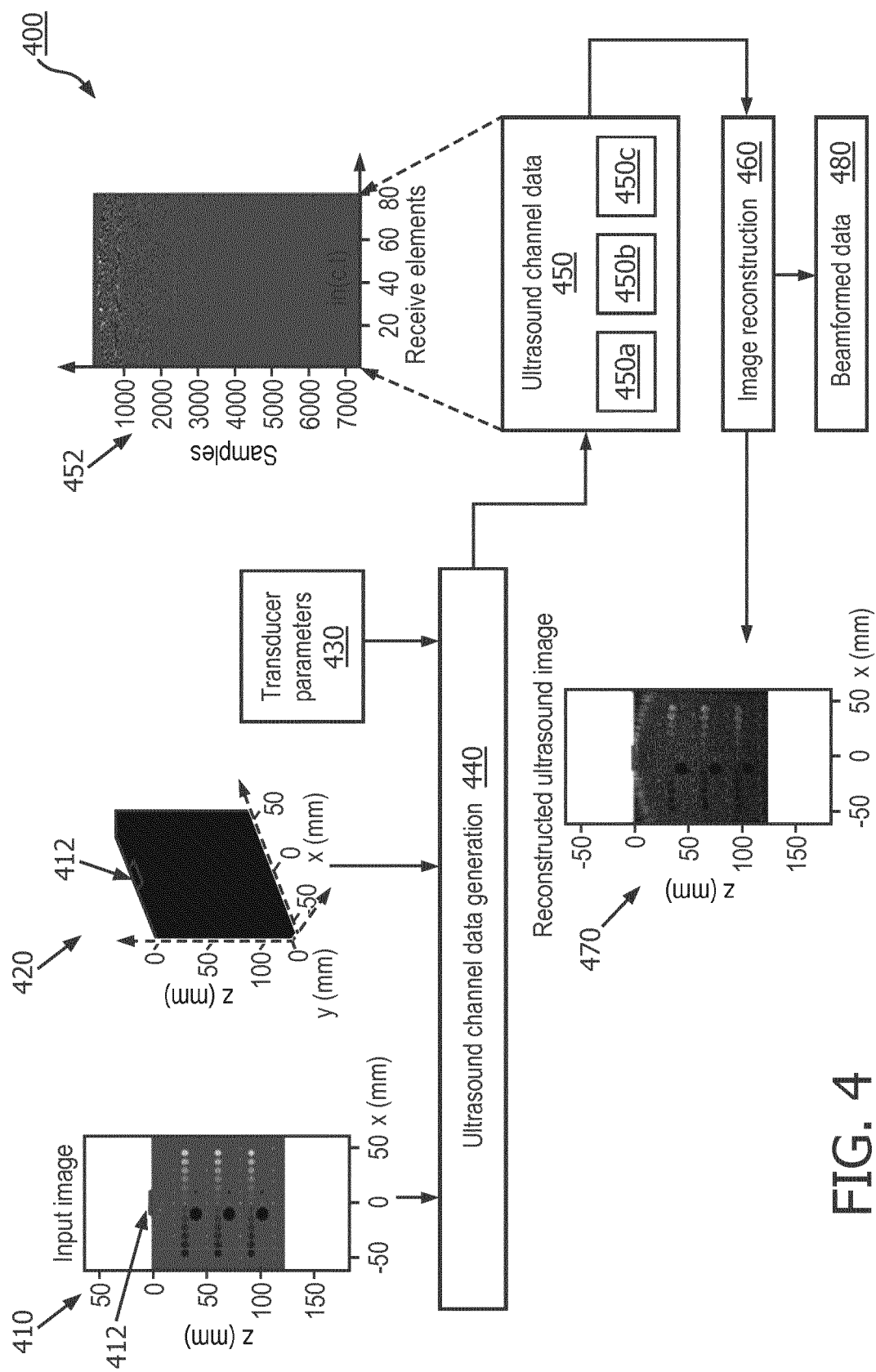
FIG. 4 is a schematic diagram illustrating a deep learning network training data generation scheme, according to aspects of the present disclosure.

FIG. 4 is a schematic diagram illustrating a deep learning network training data generation scheme 400, according to aspects of the present disclosure. The scheme 400 can be implemented by a computer system such as the host 130. The scheme 400 can be employed to generate input-output data pairs for training a deep learning network such as the deep learning network 222 or the CNN 310 for ultrasound image reconstructions.

In the scheme 400, an input image 410, a scatter map 420, and transducer array parameters 430 are provided for generating a dataset (e.g., the dataset 140). The input image 410 can be any image (e.g., a digital phantom image, a photograph image, a simulated image, or an ultrasound image) emulating an object (e.g., the objects 105 and 205) under an ultrasound examination. The input image 410 may include an echogenicity map in an x-z plane. The z-axis represents depths in an axial direction of an ultrasound transducer array 412 (e.g., the transducer 112 and 214) and the x-axis represents widths in a lateral direction of the ultrasound transducer array 412. The scatter map 420 may include random scatterer positions that simulate the backscattering of ultrasonic waves from tissues under ultrasound imaging. The transducer array parameters 430 may include a center frequency and a bandwidth of ultrasound pulse emissions, a number of transducer elements (e.g., the elements 212), an arrangement of the transducer elements, and/or any parameters related to an ultrasound transducer array.

The input image 410, the scatter map 420, and the transducer array parameters 430 are inputs to an ultrasound channel data generation unit 440. The ultrasound channel data generation unit 440 can be any suitable ultrasound imaging system simulator. The ultrasound channel data generation unit 440 simulates ultrasound wave emissions towards the input image 410 based on the transducer array parameters 430. The ultrasound channel data generation unit 440 simulates ultrasound waves reflected (e.g., echo responses) back from the image 410 based on the transducer array parameters 430 and the scatter map 420. The ultrasound channel data generation unit 440 provides the ultrasound echo responses as ultrasound channel data 450. The ultrasound channel data 450 may be similar to the digital ultrasound echo channel signals 162 of the system 100, the ultrasound echo responses in(c, t) of the system 200, or the ultrasound channel data 302.

The ultrasound channel data 450 can be in any suitable formats. In some embodiments, the ultrasound channel data generation unit 440 can output raw RF data 450a (e.g., digital RF samples). The output raw RF data 450a may correspond to the digital ultrasound echo channel data streams or signals 162. In some embodiments, the ultrasound channel data generation unit 440 can output baseband IQ data 450b. The IQ data 450b may correspond to the raw RF data 450a after down-conversion to a baseband. The IQ data 450b may be represented in a Cartesian form. For instance, the RF data 450a may have a sampling rate of about 50 megahertz (MHz), while the IQ data 450b may have a lower sampling rate of about 20 MHz with a data bandwidth that is twice the RF data bandwidth. In some embodiments, the IQ data 450b can be converted to a polar form referred to as IQ polar data 450c.

The ultrasound channel data 450 may include per channel data samples as shown in the plot 452, where the x-axis represents ultrasound transducer element indices (e.g., corresponding to channels) and the z-axis represents data samples received from each element over time. In the raw RF data 450a, the per channel data samples are per channel RF data samples (real values) in the raw RF data 450a. In the IQ data 450b, the per channel data samples are IQ samples including real and imaginary component values. In the IQ polar data 450c, the per channel data samples are IQ samples including envelope and phase components.

The ultrasound channel data 450 is provided to an image reconstruction unit 460 in any of the RF, IQ, or IQ polar forms. The image reconstruction unit 460 applies conventional ultrasound image reconstruction processing techniques (e.g., beamforming, signal processing, and/or image processing) to the ultrasound channel data 450 to reconstruct an ultrasound image 470 (e.g., the images 168) of the input image 410 (e.g., representing the object under ultrasound imaging).

The scheme 400 can be repeated for multiple images 410 to generate a training dataset including input-output pairs of ultrasound channel data 450 and corresponding reconstructed ultrasound images 470 for training a deep learning network. The size of the training dataset may be dependent on the number of transducer elements or number of channels used for the simulation and the per channel data size. For example, the IQ data 450b or IQ polar data 450c can provide a training dataset with a smaller size than the raw RF data 450a due to the IQ data sampling rate being lower than the RF data sampling rate.

In some embodiments, the image reconstruction unit 460 can further output beamformed data 480 after applying beamforming to the ultrasound channel data 450. The beamformed data 480 can include beamformed channel (i.e., time-aligned channel data) or beam-sum data (i.e., sum of all time-aligned channel data). The beamformed data 480 and the corresponding reconstructed and optimized ultrasound image 470 can form an input-output pair used for training. The beamformed data 480 has a smaller dimension than the ultrasound channel data 450. Accordingly, training datasets formed from the beamformed data 480 can have a smaller size than training datasets formed from the ultrasound channel data 450.

Figure 5:
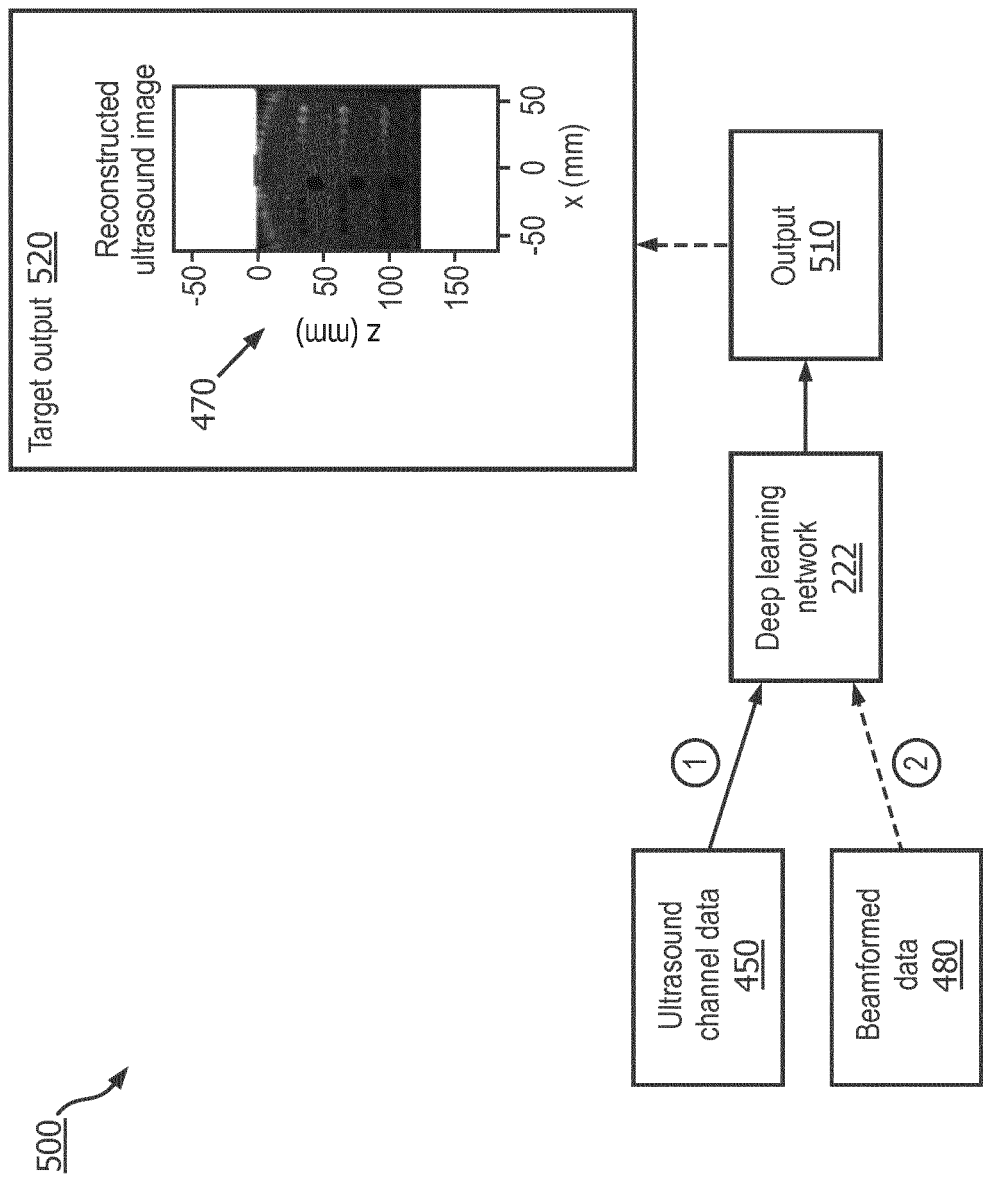
FIG. 5 is a schematic diagram illustrating a deep learning network training scheme for generating ultrasound images, according to aspects of the present disclosure.

FIG. 5 is a schematic diagram illustrating a deep learning network training scheme 500 for generating ultrasound images, according to aspects of the present disclosure. The scheme 500 can be implemented by a computer system such as the host 130. The scheme 500 can be employed to train a deep learning network such as the deep learning network 222 or the CNN 310 for ultrasound image reconstructions.

The scheme 500 trains the deep learning network 222 using input-output pairs generated by the scheme 400. For example, an input-output pair may correspond to the ultrasound channel data 450 and the reconstructed ultrasound image 470. The ultrasound channel data 450 may be an input (marked by a circle labeled 1) to the deep learning network 222 and the reconstructed ultrasound image 470 may be a target output 520 for the training.

During training, the deep learning network 222 can be applied to the ultrasound channel data 450 using forward propagation to produce an output 510 (e.g., the ultrasound image 304). The coefficients of the filters 322 in the convolutional layers 320 and the weightings in the fully connected layers 330 can be adjusted using backward propagation to minimize an error between the output 510 and the target output 520. In other words, the scheme 500 trains the deep learning network 222 to approximate the image reconstruction function $f$ in equation (3). The training optimizes the beamforming parameters parA and the backend processing parameters parB in equation (3). The training can optimize the parameters parA and parB at the same time or in multiple stages.

In another embodiment, an input-output pair may correspond to the beamformed data 480 and the reconstructed ultrasound image 470. The beamformed data 480 may be an input (marked by a circle labeled 2) to the deep learning network 222 and the reconstructed ultrasound image 470 may be a target output 520 for the training. The training mechanisms may be substantially similar to the steps described above. For example, the coefficients of the filters 322 in the convolutional layers 320 and weightings in the fully connected layers 330 are adjusted to minimize an error between the output 510 and the target output 520. In other words, the scheme 500 trains the deep learning network 222 to approximate the backend processing function $f_{BE}$ in equation (2). The training optimizes the backend processing parameters parB in equation (2).

Figure 6:
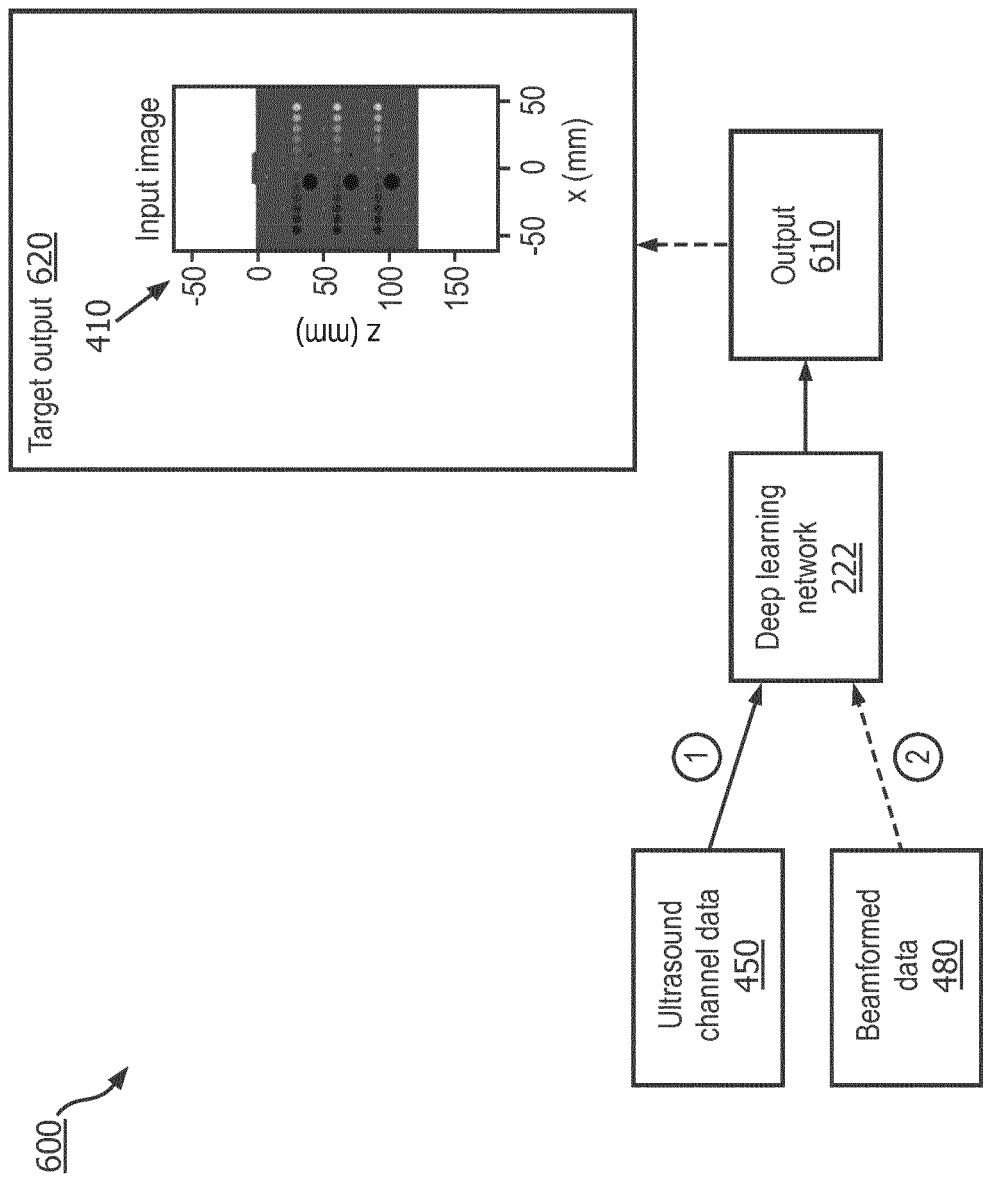
FIG. 6 is a schematic diagram illustrating a deep learning network training scheme for generating ultrasound images, according to aspects of the present disclosure.

FIG. 6 is a schematic diagram illustrating a deep learning network training scheme 600 for generating ultrasound images, according to aspects of the present disclosure. The scheme 600 can be implemented by a computer system such as the host 130. The scheme 600 can be employed to train a deep learning network such as the deep learning network 222 or the CNN 310 for ultrasound image reconstructions. The scheme 600 is substantially similar to the scheme 500, but the target output 620 for the training corresponds to the original input image 410 instead of the conventionally reconstructed ultrasound image 470. In other words, the target corresponds to an image of an object under perfect image reconstruction (e.g., super-resolution and no artifact).

As shown, an input-output pair may correspond to the ultrasound channel data 450 and the input image 410. During training, the deep learning network 222 can be applied to the ultrasound channel data 450 using forward propagation to produce an output 610. The coefficients of the filters 322 in the convolutional layers 320 and weightings in the fully connected layers 330 can be adjusted using backward propagation to minimize an error between the output 610 and the target output 620, which is the original input image 410.

The use of the original input image 410 as the target output 620 can allow the training to optimize the deep learning network 222 to produce super-resolution, speckle free images that have a higher quality than conventionally reconstructed ultrasound image (e.g., the reconstructed ultrasound image 470). In other words, the scheme 600 trains the deep learning network 222 to approximate the function $f$ in equation (3), optimizing the parameters parA and parB for super-resolution, and/or speckle free image reconstructions.

Similar to the scheme 500, the scheme 600 may train the deep learning network 222 using the beamformed data 480 as an input (marked by a circle labeled 2) to the deep learning network 222 instead of the ultrasound channel data 450.

After the deep learning network 222 is trained using the schemes 500 or 600, the deep learning network 222 can be used in the system 200 to generate ultrasound images for display on the display 230. For example, when the deep learning network 222 is trained using the ultrasound channel data 450, the probe 210 can acquire raw RF or IQ data (e.g., the ultrasound channel data 450) representative of an object (e.g., the objects 105 and 205) under examination and the deep learning network 222 can be applied to the acquired RF or IQ data to produce an ultrasound image of the object.

Alternatively, when the deep learning network 222 is trained using the beamformed data 480, the probe 210 can include a beamformer that applies beamforming to the raw RF or IQ data, and the deep learning network 222 can be applied to the beamformed signals to produce an ultrasound image of the object.

It should be noted that an ultrasound image generated by the deep learning network 222 may include similar characteristics or traits (e.g., the resolution) as the image used for the training target. For example, a deep learning network 222 trained using the scheme 500 may generate ultrasound images including similar characteristics or traits as the image 470 (e.g., the target output 520). When the image 470 includes speckle, the generated ultrasound image may also include some amount of speckle. Similarly, a deep learning network 222 trained using the scheme 500 may generate ultrasound images including similar characteristics or traits as the original high-resolution image 410 (e.g., the target output 620). When the image 410 includes a resolution of about 1 wavelength or less, the generated ultrasound image may also include a similar resolution. As an example, when the target image includes 256 pixels over a 5 mm range, the resolution is about 0.00195 mm.

Figure 7:
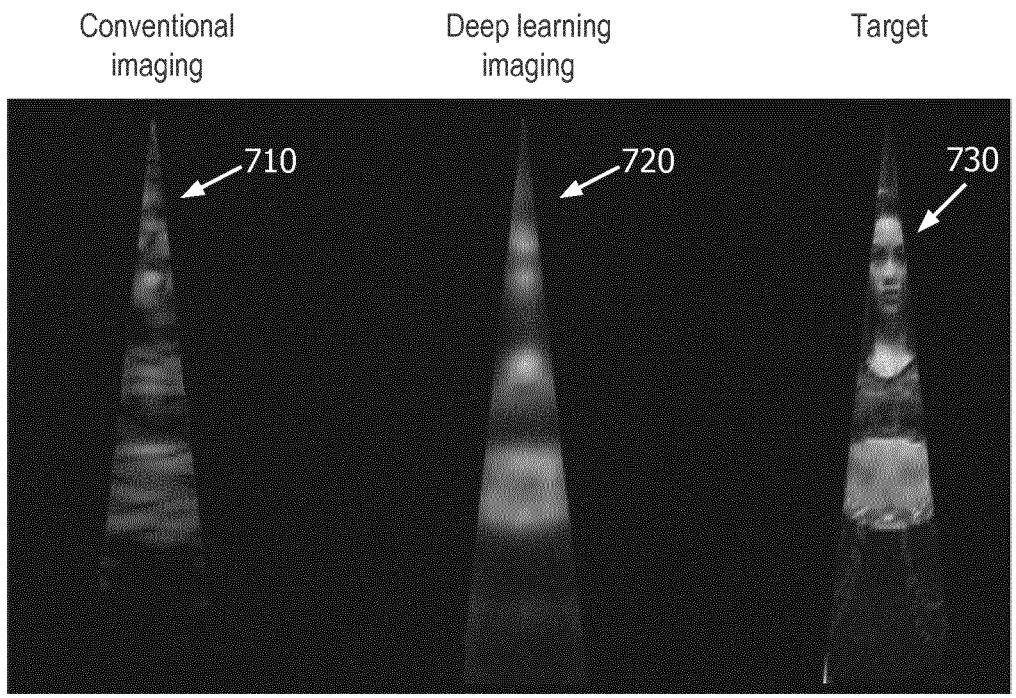
FIG. 7 illustrates images generated from conventional imaging and deep learning-based imaging in comparison to a target image, according to aspects of the present disclosure.

FIG. 7 illustrates images generated from conventional imaging and deep learning-based imaging in comparison to a target image, according to aspects of the present disclosure. FIG. 7 shows a target image 730, a conventionally reconstructed image 710, and a deep learning-based reconstructed image 720. For example, the target image 730 may represent an object (e.g., the objects 105 and 205) under ultrasound imaging. The target image 730 may correspond to the input image 410. The conventionally reconstructed image 710 is generated from the target image 740 using similar mechanisms as described in the scheme 400, where ultrasound echo responses can be simulated from the target image 730, followed by conventional beamforming, signal processing, and/or image processing. The deep learning-based reconstructed image 720 is generated from the target image 730 by applying a deep learning network (e.g., the deep learning network 222) trained using the scheme 600. As can be observed, the deep learning-based reconstructed image 720 has a higher resolution and a higher quality than the conventionally reconstructed image 710.

Figure 8:
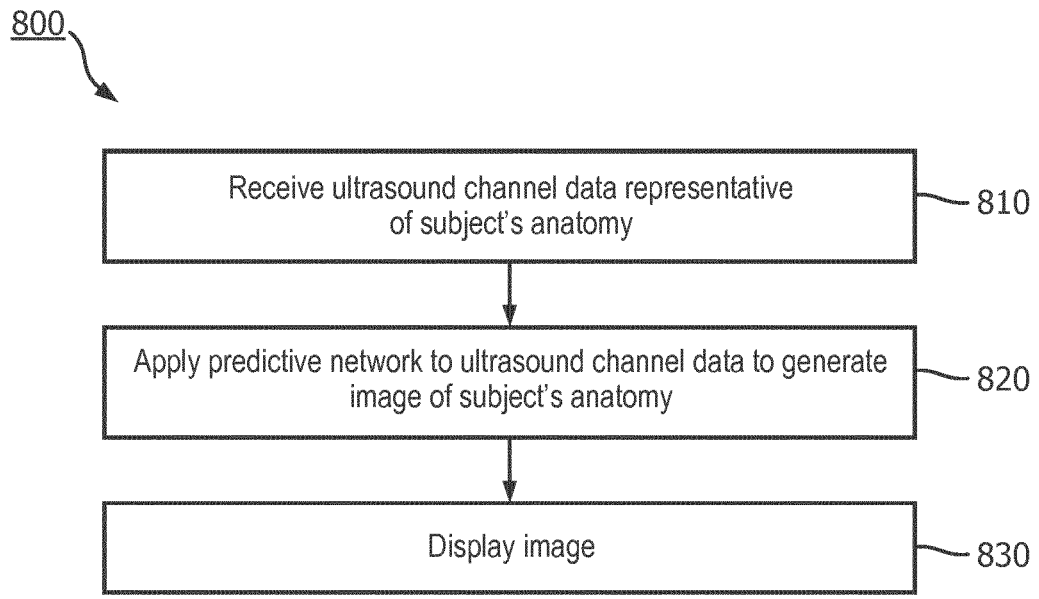
FIG. 8 is a flow diagram of a deep learning-base ultrasound imaging method, according to aspects of the present disclosure.

FIG. 8 is a flow diagram of a deep learning-base ultrasound imaging method 800, according to aspects of the present disclosure. Steps of the method 800 can be executed by the system 200, for example, by a processor, processing circuit, and/or other suitable component such as the probe 210, the deep learning engine 220, and/or the display 230. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 810, the method includes receiving ultrasound channel data (e.g., the ultrasound channel data 302 and 450 and the image data 252) representative of a subject's anatomy (e.g., the objects 105 and 205). The ultrasound channel data are generated from an ultrasound transducer (e.g., the transducer 112 or 214). The ultrasound channel data can be received from the ultrasound transducer or retrieved from a network (e.g., the cloud storage network 250).

At step 820, the method 800 includes applying a predictive network (e.g., the deep learning network 222 and the CNN 310) to the ultrasound channel data to generate an image (e.g., the images 304, 470, and 720) of the subject's anatomy.

At step 830, the method 800 includes displaying the image of the subject's anatomy on a display (e.g., the displays 132 and 230).

In an embodiment, the ultrasound transducer may comprise an array of acoustic elements (e.g., the elements 212). The ultrasound channel data may include a plurality of ultrasound echo channel data streams, where each of the plurality of ultrasound echo channel data streams is received from one acoustic element of the array of acoustic elements.

In an embodiment, the plurality of ultrasound echo channel data streams include RF data (e.g., the RF data 450a) representing the subject's anatomy. In an embodiment, the method 800 includes converting the RF data to IQ data (e.g., the IQ data 450b and the IQ polar data 450c) before applying the predictive network. In an embodiment, the method 800 includes performing beamforming (e.g., the beamforming operations 240) on the ultrasound echo channel data streams before applying the predictive network.

In an embodiment, the image includes at least one of morphological information of the subject's anatomy, functional information of the subject's anatomy, or a quantitative measurement of the subject's anatomy. In an embodiment, the image includes at least one of B-mode information of the subject's anatomy, stress information of the subject's anatomy, elasticity information of the subject's anatomy, tissue Doppler information of the subject's anatomy, or blood flow Doppler information of the subject's anatomy.

Aspects of the present disclosure can provide several benefits. For example, the use of deep learning to reconstruct ultrasound images from raw RF data (e.g., the RF data 450a), IQ data (e.g., the IQ data 450b and the IQ polar data 450c), and/or beamformed data (e.g., the beamformed data 480) acquired from a probe (e.g., the probes 110 and 210) can reduce computational complexity and system complexity compared to conventional ultrasound image reconstructions using beamformers, signal processing engines, and/or image processing engines. For example, the application of the deep learning network may be realized using simple hardware and/or software such as an ASIC and/or an FPGA. Accordingly, the present disclosure may allow for a miniaturized in-transducer ultrasound imaging engine (e.g., the deep learning engine 220 integrated within a probe 210 or IVUS). In addition, the use of a high-resolution image (e.g., the original input image 410) as a target output for the training allows the deep learning network to be optimized for generating high-resolution and/or speckle free images that have a higher quality than conventionally generated ultrasound images. Further, the use of simulation-based deep learning training data generations can provide a sufficiently large training dataset in a short amount of time. Accordingly, the present disclosure can reduce the development time and cost for new ultrasound applications, allowing deployments of new ultrasound applications quickly.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An ultrasound imaging system comprising:
a processor configured to:
receive ultrasound data representative of a subject's anatomy and generated from an ultrasound transducer;
provide the ultrasound data as an input to a convolutional neural network (CNN) comprising:
a plurality of convolutional layers comprising a plurality of coefficients; and
a plurality of fully connected layers comprising a plurality of weightings,
wherein the plurality of coefficients and the plurality of weightings are configured to minimize an error between:
a predicted image generated by the CNN without using beamforming; and
a beamformed ultrasound image generated using beamforming;
provide, as an output of the CNN, an image of the subject's anatomy that is generated based on the minimized error between the predicted image and the beamformed ultrasound image; and
output, to a display in communication with the processor, the image of the subject's anatomy.

2. The ultrasound imaging system of claim 1,
wherein the ultrasound transducer comprises an array of acoustic elements,
wherein the ultrasound data includes a plurality of ultrasound echo channel data streams, and
wherein each of the plurality of ultrasound echo channel data streams is generated from one acoustic element of the array of acoustic elements.

3. The ultrasound imaging system of claim 2, wherein the processor is further configured to:
perform beamforming on the ultrasound echo channel data streams before applying the CNN.

4. The ultrasound imaging system of claim 1, wherein the image of the subject's anatomy includes at least one of morphological information of the subject's anatomy, functional information of the subject's anatomy, or a quantitative measurement of the subject's anatomy.

5. The ultrasound imaging system of claim 1, wherein the image of the subject's anatomy includes at least one of B-mode information of the subject's anatomy, stress information of the subject's anatomy, elasticity information of the subject's anatomy, tissue Doppler information of the subject's anatomy, or blood flow Doppler information of the subject's anatomy.

6. The ultrasound imaging system of claim 1, wherein the predicted image is generated by the CNN from test ultrasound channel data representative of a test subject.

7. The ultrasound imaging system of claim 6, wherein the beamformed ultrasound image is generated from the test ultrasound channel data by performing at least one of B-mode processing, Doppler processing, or scan conversion processing on the test ultrasound channel data.

8. The ultrasound imaging system of claim 6, wherein the test ultrasound channel data is generated from the beamformed ultrasound image based on an ultrasound transducer configuration parameter.

9. The ultrasound imaging system of claim 6, wherein the test ultrasound channel data includes at least one of radio frequency (RF) data, in-phase quadrature-phase (IQ) data, or beamformed data.

10. The ultrasound imaging system of claim 6, wherein the test ultrasound data comprises simulated ultrasound channel data.

11. The ultrasound imaging system of claim 10, wherein the processor is configured to generate the simulated ultrasound channel data based on non-ultrasound images.

12. The ultrasound imaging system of claim 1,
further comprising an ultrasound imaging probe including the ultrasound transducer, and
wherein the processor is configured for communication with the ultrasound transducer and configured to receive the ultrasound data from the ultrasound transducer.

13. The ultrasound imaging system of claim 12, wherein the ultrasound imaging probe includes the processor.

14. The ultrasound imaging system of claim 1,
further comprising a memory configured to store the CNN and
wherein the processor is configured for communication with the memory.

15. The ultrasound imaging system of claim 1, wherein the CNN is configured to generate the image without performing, on the ultrasound data, at least one of filtering, dynamic range application, or compression.

16. The ultrasound imaging system of claim 1,
wherein the image of the subject's anatomy comprises a trait,
wherein the trait is a resolution of about 1 wavelength or below.

17. The ultrasound imaging system of claim 1,
wherein the image of the subject's anatomy comprises a trait,
wherein the trait is an amount of speckle,
wherein the image is speckle free.

18. The ultrasound imaging system of claim 1, wherein the output of the CNN is the image of the subject's anatomy such that display depicts the output of the CNN.

19. The ultrasound imaging system of claim 1, wherein the processor is configured to:
receive the ultrasound data in RF form;
convert the ultrasound data from RF form to in-phase quadrature-phase (IQ) form; and
provide the ultrasound data as the input to the CNN in the IQ form.

20. The ultrasound imaging system of claim 1, wherein the CNN is configured to generate the image of the subject's anatomy without using beamforming on the ultrasound data.

21. The ultrasound imaging system of claim 20, wherein the CNN is configured to generate the image of the subject's anatomy as an approximation of using beamforming on the ultrasound data.

22. A method of ultrasound imaging, comprising:
receiving ultrasound data representative of a subject's anatomy and generated from an ultrasound transducer;
providing the ultrasound data as an input to a convolutional neural network (CNN) comprising:
a plurality of convolutional layers comprising a plurality of coefficients; and
a plurality of fully connected layers comprising a plurality of weightings,
wherein the plurality of coefficients and the plurality of weightings are configured to minimize an error between:
a predicted image generated by the CNN without using beamforming; and
a beamformed ultrasound image generated using beamforming;
providing, as an output of the CNN, an image of the subject's anatomy that is generated based on the minimized error between the predicted image and the beamformed ultrasound image; and
displaying, by a display, the image of the subject's anatomy.

23. The method of claim 22,
wherein the ultrasound transducer comprises an array of acoustic elements,
wherein the ultrasound data includes a plurality of ultrasound echo channel data streams, and
wherein each of the plurality of ultrasound echo channel data streams is generated from one acoustic element of the array of acoustic elements.

24. The method of claim 23, further comprising:
performing beamforming on the ultrasound echo channel data streams before applying the CNN.

25. The method of claim 22, wherein the image of the subject's anatomy includes at least one of morphological information of the subject's anatomy, functional information of the subject's anatomy, or a quantitative measurement of the subject's anatomy.

26. The method of claim 22, wherein the image of the subject's anatomy includes at least one of B-mode information of the subject's anatomy, stress information of the subject's anatomy, elasticity information of the subject's anatomy, tissue Doppler information of the subject's anatomy, or blood flow Doppler information of the subject's anatomy.

* * * * *